No. 800,281. PATENTED SEPT. 26, 1905.
W. ESCH, Sr.
ICE HARVESTER.
APPLICATION FILED JAN. 16, 1905.

Witnesses:
Fred. J. Schad Jr.
Rozim R. Symmo.

Inventor:
William Esch Sr.
By R. J. Jacker
Atty.

UNITED STATES PATENT OFFICE.

WILLIAM ESCH, SR., OF CHICAGO, ILLINOIS.

ICE-HARVESTER.

No. 800,281.　　　　Specification of Letters Patent.　　　　Patented Sept. 26, 1905.

Application filed January 16, 1905. Serial No. 241,398.

*To all whom it may concern:*

Be it known that I, WILLIAM ESCH, Sr., residing at Chicago, in the county of Cook and State of Illinois, have invented a new and useful Ice-Harvester, of which the following is a specification.

My invention relates to a harvester provided with a cutter, a motor for propelling, and means for steering the machine; and the objects of my improvements are, first, to provide a motor on the machine for propelling the same along; second, to facilitate the steering of the machine; third, to make a strong, durable, and economical construction, and other objects to become apparent from the description to follow.

I have illustrated and will describe a machine constructed in a manner which I at present consider the best, but which I may find from experience is somewhat impractical and I may want to change, such changes in the construction and arrangement I desire to have understood as being covered by the appended claims in so far as is possible in view of the prior state of the art.

My invention, as illustrated, consists of a rectangular body-frame mounted on four wheels, two of which are provided with spurs to prevent slipping while propelling the vehicle and two of which are pivoted for steering purposes. A circular saw is mounted in a frame pivoted to the body-frame and arranged to be raised and lowered by the operator seated on the machine. A motor of any preferable type is mounted on the body-frame within reach of the operator and by means of intermediate gearing propels the machine along and rotates the saw. The raising and lowering of the cutter or saw is preferably done by manual power; but it may also be connected up with the motor by supplying the necessary gear, and any desired steering-gear may be used for operating the front wheels.

Figure 1:
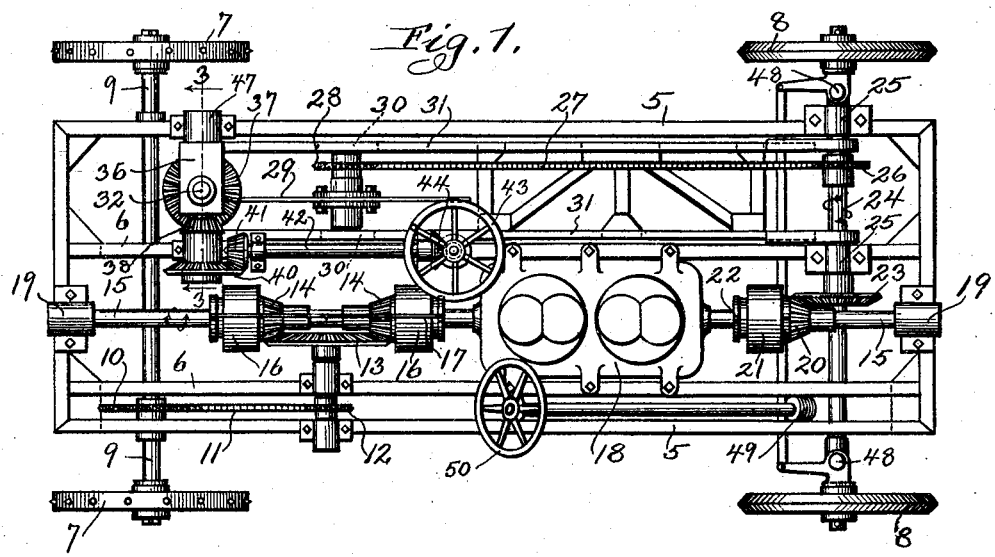
Figure 2:
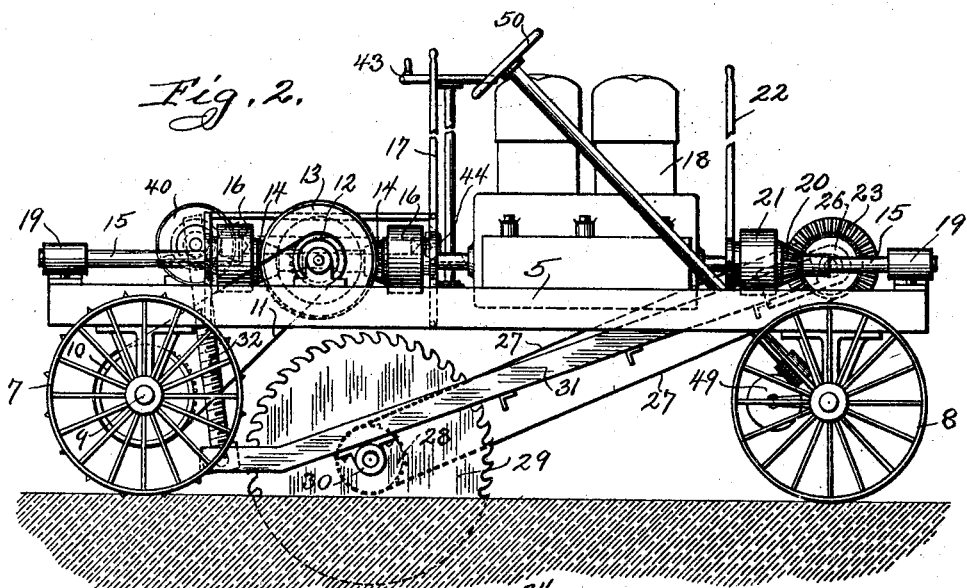
Figure 3:
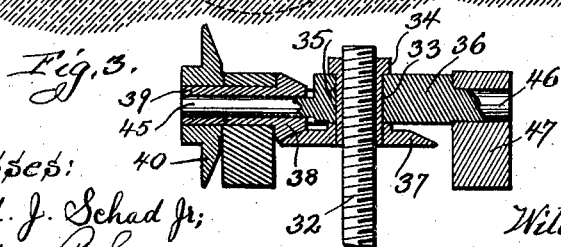

In the drawings, Figure 1 is a plan view of a machine embodying my invention. Fig. 2 is a side elevation of the same, and Fig. 3 is a section on 3 3 of Fig. 1.

Similar reference characters refer to similar parts throughout the several views.

The body of the machine consists of the rectangular frame 5, provided with the longitudinally-extending beams 6, which is mounted on the two rear wheels 7 and the two front wheels 8. The wheels 7 are secured to the shaft or axle 9, provided with a sprocket-wheel 10, which is connected by the chain 11 to the sprocket-wheel 12, secured on the same shaft with the bevel-gear 13. Meshing with the bevel-gear 13 are the two small bevel-pinions 14, loosely mounted on the drive-shaft 15. The clutches 16 are secured to the shaft 15 adjacent to the pinions 14, which are operated by the duplex lever 17.

The pinions 14 mesh with the diametric opposite sides of the gear 13, so that they tend to rotate the gear 13 in opposite directions. Thus, if the shaft 15 is rotating continually in one direction and the lever 17 is brought to a central position neither one of the clutches 16 will be in action and the rear wheels 7 will remain at rest. If the lever 17 is moved forward of its central position, one of the pinions 14 will be clutched to the shaft 15 and the wheels 7 rotated to propel the vehicle forward, and if the lever 17 is moved backward of its central position the other of said pinions 14 will be clutched to the shaft 15 and the wheels 7 rotated to propel the vehicle backward by means of the gear 13, sprockets 10 and 12, chain 11, and axle 9.

The shaft 15 is driven by a motor 18, which is mounted on the frame 5. This shaft 15 is preferably the motor-shaft and extends the entire length of the machine, mounted in bearings 19, secured to frame 5. On the forward part of the shaft 15 is mounted the small bevel-pinion 20, arranged to be clutched to the shaft 15 by the clutch 21, operated by lever 22.

The pinion 20 is in constant mesh with the bevel-gear 23, secured to shaft 24, mounted in bearings 25, secured to frame 5. A sprocket-wheel 26 is also secured to the shaft 24, which is connected by the chain 27 to sprocket-wheel 28, secured to the same shaft with the saw 29, which is journaled in the bearings 30, secured near the free end of a pivoted frame 31. The one end of the frame 31 is pivoted on the shaft 24, and the remaining end of said frame has pivotally connected thereto the lower end of a screw-threaded shaft or bar 32. The upper end of the bar 32 is fitted into the nut 33, provided at its upper end with a projecting collar 34, which prevents it from passing through the perforation 35 in the block 36, in which it is fitted to rotate. When the nut 30 is rotated in one direction, the bar 32 will travel upward, and when the nut 33 is rotated in the opposite direction, the bar 32 will travel downward. The nut 33 extends some distance below the block, where it has secured thereto a bevel-gear 37, meshing with a small bevel-gear 38, secured on the same shaft 39 with a bevel-gear 40. The gear 40 meshes with a bevel-gear 41, secured to shaft 42, mounted in bearings on the frame 5 and arranged to be rotated by a hand-wheel 43 by means of the connecting-gears 44. The bar 32 is prevented from rotating by its connection to the frame 31 and serves to swing the frame 31 up and down in an arc about the shaft 24 when the nut 33 is rotated, thus raising and lowering the saw 29. To permit the lower end of the bar 32 to swing with the frame 31 in an arc about the shaft 24, the block 36, carrying the nut 33, is pivoted concentrically with the shaft 39 by having a stud 45 extending into a hole provided in the center of shaft 39 and a stud 46 concentric with the stud 45 in a bearing 47, secured to frame 5. By this construction the saw 29 can be lowered to cut a considerable distance below the surface of the ice and can be raised when desired.

While in actual operation of cutting the ice the machine travels forward in a straight line; but when it arrives at the end of the ice-field it must be turned about end for end, and to accomplish this the front wheels 8 are pivoted at 48 and are provided with the steering-gear 49, which is controlled by the hand-wheel 50.

After the first cut across the field has been made I prefer to guide the machine so as to make all succeeding cuts parallel with the first by some kind of a guiding apparatus (not shown) to trace or travel in the last preceding cut.

Having thus fully described my invention, what I claim as new, and desire to secure by Letters Patent of the United States, is—

1. In a machine of the class described, a suitable frame, two propelling-wheels mounted on a propelling-shaft near one end of said frame, steering-wheels mounted near the other end of said frame, a motor mounted on said frame, arranged to rotate a drive-shaft mounted on said frame, a gear controlled by a friction-clutch mounted on said drive-shaft meshing with a gear secured to a counter-shaft mounted on said frame, a vertically-swinging frame pivoted on said counter-shaft, a cutter rotatably mounted on the free end of said swinging frame, a sprocket secured to said cutter, a sprocket secured to said counter-shaft and a chain connecting said two sprockets, two bevel-gears controlled by independent friction-clutches mounted on said drive-shaft meshing with a bevel-gear connected by chain and sprockets to said propelling-shaft, means for raising and lowering the free end of said swinging frame and means for controlling the steering-wheels.

2. In a machine of the class described, a suitable frame, a motor mounted on said frame arranged to rotate a drive-shaft mounted in bearings secured to said frame, a counter-shaft rotatably mounted on said frame, a frame having a cutter rotatably mounted in its free end pivoted on said counter-shaft, means comprising a clutch operatively connecting said cutter to said drive-shaft and means comprising two clutches connecting said drive-shaft to traction-wheels to rotate said wheels in either direction while said drive-shaft is continually rotating in one direction.

3. In a machine of the class described, a suitable frame traction-wheels and steering-wheels, a motor mounted on said frame arranged to rotate a drive-shaft, a counter-shaft, a cutter-frame pivoted on said counter-shaft, a rotating cutter mounted in the free end of said frame, means for driving said cutter by said drive-shaft comprising a clutch, means for rotating said traction-wheels in either direction by said drive-shaft comprising two clutches, means for raising and lowering the free end of said cutter-frame comprising a screw-threaded rod and a rotating nut, and means for operating the steering-wheels.

In testimony whereof I have signed my name to this specification, in presence of two subscribing witnesses, this 9th day of January, 1905, at Chicago, Illinois.

WILLIAM ESCH, Sr.

Witnesses:
EDWARD G. JACKER,
R. J. JACKER.